June 28, 1949.                J. E. COLLINS                2,474,347
                              FLEXIBLE DRIVE
                            Filed June 11, 1947
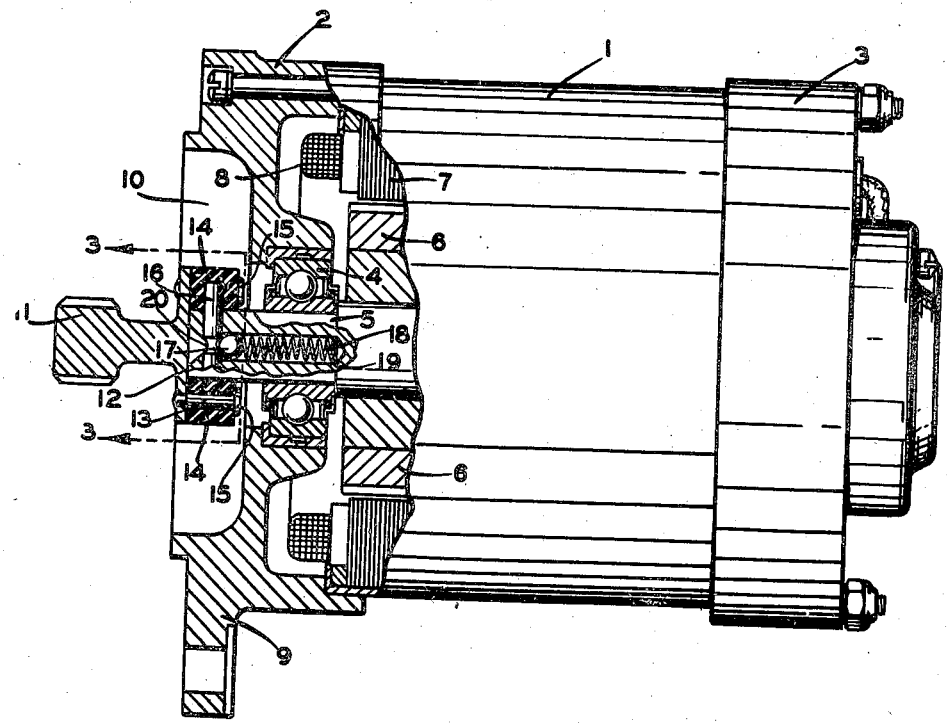
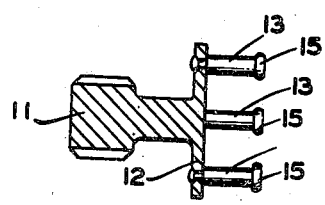 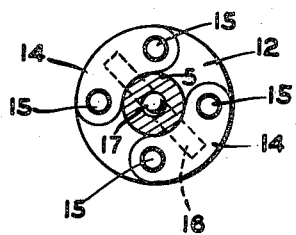
-INVENTOR-
JOHN EDWARD COLLINS
BY
-ATTORNEY- Patented June 28, 1949

2,474,347

UNITED STATES PATENT OFFICE 2,474,347

FLEXIBLE DRIVE

John Edward Collins, Belleville, N. J., assignor to Bendix Aviation Corporation, Teterboro, N. J., a corporation of Delaware Application June 11, 1947, Serial No. 754,004

3 Claims. (Cl. 64—11)

The present application relates to a flexible generator drive and more particularly to improvements in a drive shaft construction for damping the effects of engine vibration.

An object of the invention is to provide a simplified vibration damping means including a driving member and a pair of rubber buffers segments which transmit power through pins projecting from the driving member.

Another object of the invention is to provide a novel cross pin arrangement whereby the buffer segments may be drivingly connected to a driven shaft by a releasable ball and spring arrangement.

Another object of the invention is to provide a novel flexible drive including rubber segments easily replaced by those of increasing or decreasing hardness to provide correct torsional vibration absorption.

Another object of the invention is to provide a simplified vibration damping means which drive satisfactorily in spite of misalignment of the drive and driven shafts.

Another object of the invention is to provide a more trouble-free and compact coupling.

The above and other objects and features of the invention will appear more fully hereinafter from a consideration of the following description taken in connection with the accompanying drawing wherein one embodiment of the invention is illustrated by way of example.

In the drawing:

Fig. 1 is a longitudinal fragmentary sectional view of a device embodying the invention.

Fig. 2 is a sectional view of the driving member with the rubber bumper segments removed.

Fig. 3 is an end view of the resilient coupling taken along the lines 3—3 of Fig. 1.

The invention is shown in the drawing of Fig. 1 as incorporated in a cylindrical housing 1 having end bearing plates 2 and 3 respectively. Mounted in the end bearing plate 2 is the bearing assembly 4 in which is rotatably mounted a shaft 5. Affixed to the shaft 5 is a rotor 6 of a conventional type and which cooperates with a stator of the generator alternator. The stator includes pole pieces 7 which project from the inner surface of the housing 1. About the pole pieces 7 are suitable field windings 8 of conventional type.

Projecting from the end plate 2 is a flange 9 for a facilitating the mounting of the unit on the wall or crank case of a prime mover or engine. The end plate 2 has formed therein a recess 10 for receiving the novel flexible drive shaft and vibration damping means. The latter means includes a splined end 11 formed integrally with a driving plate member 12 rotatably mounted within the recess 10 of the end plate 2. Pins 13 project from the driving member 12 and are arranged to support rubber or other suitable resilient buffer segments 14 which slip over head portions 15 of the pins 13.

Engaged in the rubber buffer segments 14 is a cross pin 16 which extends through the driven shaft 5. The cross pin 16 is releasably fixed in the shaft 5 by a ball 17, and spring 18 mounted in a channel 19 formed in the shaft 5. The ball 17 engages in a recess 20 formed in the cross pin 16, as best shown in Fig. 1, so as to hold the pin 16 in place so as to prevent loss of the same in field service.

From the foregoing, if will be seen that the segments 14 may be easily replaced by slipping the same over the heads 15 of the pins 13. However, during normal operation, the pin 16 and the heads 15 of the pins 13 serve to hold the buffer segments 14 in operating relation.

Moreover, the arrangement of the buffer segments 14 as shown, permits a satisfactory drive in spite of misalignment of the driving and driven shafts. Further, through the latter arrangement a compact coupling is provided.

Although only one embodiment of the invention has been illustrated and described, various changes in the form and relative arrangements of the parts may be made to suit requirements.

What is claimed is:

1. In a device of the class including a casing, a stator carried by the casing, and a driven shaft rotatably mounted in the casing and carrying a rotor member; the improvement comprising a driving shaft, a plate affixed to said driving shaft, pin members axially extending from said plate, a pair of rubber buffer segments carried by said pin members, a cross pin releasably mounted in said driven shaft for engagement in said buffer segments at opposite ends of said cross pin so as to flexibly couple said driving and driven shafts.

2. A flexible coupling, comprising, in combination, a driving shaft, a driven shaft, a plurality of resilient buffer segments, means connecting said buffer segments to one of said shafts, a cross member projecting from said other shaft to flexibly engage said buffer segments for coupling said driving and driven shafts, in which there is mounted in said other shaft a spring, and a ball biased by said spring into engaging relation with said cross member for releasably locking the cross member in engaging relation with said buffer segments.

3. A flexible coupling, comprising, in combination, a driving shaft, a driven shaft, a plate affixed to said driving shaft, pin members projecting from said plate, a pair of rubber buffer segments carried by said pin members, said pin members having head portions for releasably securing said buffer segments to said plate, a cross pin projecting from said driven shaft to engage at opposite ends in said buffer segments, said driven shaft having a channel extending longitudinally therein, a spring positioned in said channel, a ball positioned in said channel and biased by said spring, said cross pin having a recess formed therein for engagement by said ball so as to releasably lock said buffer segments in coupling relation between said driving and driven shafts.

JOHN EDWARD COLLINS.

REFERENCES CITED

The following references are of record in the file of this patent:

UNITED STATES PATENTS

| Number | Name | Date |
| --- | --- | --- |
| 472,707 | Hunt | Apr. 12, 1892 |
| 1,353,677 | Tomlinson | Sept. 21, 1920 |